DIGITAL DATA REDUNDANCY REDUCTION METHODS AND APPARATUS

Filed Nov. 22, 1966 4 Sheets-Sheet 1

INVENTORS
LAWRENCE W. GARDENHIRE
& ASHBY M. WOOLF
BY Hurvitz, Rose & Greene
ATTORNEYS INVENTORS
LAWRENCE W. GARDENHIRE
& ASHBY M. WOOLF
BY Hurwitz, Rose & Greene
ATTORNEYS INVENTORS
LAWRENCE W. GARDENHIRE
& ASHBY M. WOOLF
BY Hurvitz, Rose & Greene
ATTORNEYS

DIGITAL DATA REDUNDANCY REDUCTION METHODS AND APPARATUS

INVENTORS
LAWRENCE W. GARDENHIRE
& ASHBY M. WOOLF
BY Hurvitz, Rose & Greene
ATTORNEYS 3,478,266
DIGITAL DATA REDUNDANCY REDUCTION METHODS AND APPARATUS Lawrence W. Gardenhire, Eau Gallie, Fla., and Ashby M. Woolf, Ann Arbor, Mich., assignors to Radiation Incorporated, Melbourne, Fla., a corporation of Florida Filed Nov. 22, 1966, Ser. No. 596,263
Int. Cl. H04b *1/04, 7/02*
U.S. Cl. 325—38 11 Claims

ABSTRACT OF THE DISCLOSURE

A method of reducing the amount of redundant digital data transmitted from sampled values of an observed parameter is performed by storing the highest and the lowest of the sampled values obtained since the transmission of the last non-redundant sample, comparing each sampled value with limits consisting of the highest and lowest values presently stored, and if those limits are exceeded, transmitting as a non-redundant sample a value between the limits when the sample presently under observation is greater than the presently stored lowest value or less than the presently stored highest value by a predetermined tolerance value.

The present invention relates generally to communication systems for transmission of digital data, and more particularly to methods and apparatus for reducing or substantially eliminating redundancy in the transmission of digital data.

Basic principles of information theory, as set forth, for example, in Shannon, "A Mathematical Theory of Communications," Bell System Technical Journal, volume 27, July 1948, pp. 379 et seq., indicate that the information content of a message is a function of the number of signal combinations possible in the message and of the relative frequency of occurrence of each combination. Number of possible signal combinations refers to the number of different combinations of permissible signal levels that may occur on a message channel in a given interval of time. Since the amount of information contained in any message is dependent upon the unpredictability or uncertainty of the message content at the receiving end of the channel or channels, it is quite apparent that a knowledge of greater likelihood of occurrence of certain signal combinations than of others in received messages is tantamount to a reduction in message information content and a waste of available information carrying capacity of the message channel.

In most message transmission systems, such as telemetry systems for conveying data measured or sensed at a remote point in space, or more conventional audio and picture transmission systems relying on digital data transmission, a certain amount of redundancy exists in each transmitted message. That is, the information content of the message is usually less, and often far less, than its maximum possible content because the signals or signal combinations embodying the message are not independent of each other and, hence, are not equally likely to occur. If no attempt is made to reduce this redundancy, valuable system capacity is severely pared as a result of transmission of information at a rate below the maximum rate of which the system is capable. It is common practice, however, to resort to the use of established redundancy reduction techniques in such instances, so as to acquire the same amount of information with low system capacity as could be realized with substantially larger system capacities in which a high percentage of data redundancy is present.

It is the primary object of the present invention to provide new and improved methods of and systems for reducing redundancy in digital data.

Among the more widely used redundancy reduction schemes of the prior art are the so-called "fan" method and "step" (or "zero order") method. In the fan method, if the monitored data is within prescribed bounds for a known function of data variation, subsequent transmission is ceased until the data falls outside those bounds. At the receiver, the data points are collected and each piece of data between transmitted points is ascertained by interpolation according to the known function of data variation. In particular, a series of upper and lower limits or fans of slope set by prescribed tolerances $\pm\delta$ from the known function are established from the first sample $y_1$ of an interval and subsequent points $y_n \pm \delta_{max}$, where $n \geq 2$. If $y_{n+1}$ lies outside the limits defined by the diverging fan lines, $y_n$ is considered to be non-redundant, and is therefore transmitted.

The prior art "step" method is a zero order redundancy reduction technique in which a tolerance is established about the present data sample, and all future samples within the preset tolerance are assigned the same value as the sample for which the established limits were set. Reproduction of the original waveform is achieved by reconstruction between transmitted noise peaks (indicative of signal peaks since received data includes signal plus noise).

Zero-order interpolation and zero-order redundancy reduction techniques are employed to best advantage on first-order data, i.e., data which, in the frequency domain, has a final slope of 6 db per octave or, in the time domain, is a waveform having sudden breaks or discontinuities. Undersampling of data tends to produce large jumps or breaks therein so that the data appears to be first-order data. Since most digital television and digital voice data can be undersampled with no apparent loss of information content because of the inability of the eye or ear of the observer to detect the gaps, it appears that a zero-order method of reducing redundancy in such data will often perform better than the higher order, more complex schemes. This, however, is valid only if the sampling rate is sufficiently high that the foldover frequencies produced by aliasing effects are so small as to be relatively unnoticed by the observer. A further consideration is the conversion noise present in the sampling process, the limiting factor as to how much reduction is possible being directly proportional to conversion noise. The conversion noise is the system noise produced during the scanning process through the digitizing. Since high resolution scanning devices ordinarily produce low outputs, the detectors must be sensitive and are therefore more subject to system noise. A further limitation on the amount of reduction possible is the amount of quantization noise present, if it is desired to operate at a tolerance near the quantization error.

In many systems it is possible to eliminate much of the noise with a presampling filter; however, a filter often eliminates a substantial amount of data, producing errors of omission much more severe than the problems which would exist with unfiltered noise. Since the noise is usually of a higher frequency it will be grossly undersampled during processing of the sensed or measured data, and therefore can be best handled by a zero-order scheme.

However, a straight forward zero-order scheme such as the conventional step method of redundancy reduction is troublesome since reconstruction of the data at the receiver is based upon transmission of noise peaks only. As previously noted, the step method merely establishes a tolerance around the present sample, and any future sample will have the same value as the present sample so long as it is within the preset tolerance. Therefore, reconstruction of the waveform between the noise peaks may vary greatly from reconstruction obtained from real points. When the noise peak is not undersampled, i.e., when there are many samples of the noise peak present, the interpolation filters utilized to reconstruct the data tend to average out the peaks and very little damage results. On the other hand, removal of redundancy obviously results in transmission of only a few noise peaks, each of these having much more weight than the case above; that is, each being significant in any attempt to attain true reproduction of a waveform.

The present invention provides an improved redundancy reduction method which will hereinafter be referred to as the extended step method. Briefly, the extended step method is a zero order scheme which involves taking a weighted average of the noise peaks rather than transmitting the peaks themselves, and transmitting samples which may not be the actually sampled values. When the tolerance utilized for determining the weighted average is selected to be just above one-half of the peak-to-peak noise, the transmitted data is such that the waveform reconstructed therefrom amounts to a line drawn midway between noise peaks, if the noise is correlated.

In essence, if any sample falls outside the limits imposed by variable minimum or maximum values, ascertained and assigned in accordance with the value of each sample under observation as compared with the value of the immediately preceding sample, plus, or minus twice the value of a preselected tolerance, respectively, this tolerance based on acceptable error in level for the number of possible levels any given sample may assume, then a weighted average of the maximum and minimum values presently assigned is transmitted as a nonredundant sample. This method significantly reduces the number of samples transmitted as nonredundant, while maintaining a maximum possible error equal to the preselected tolerance divided by total number of possible sample levels. Hence, the error may be as small as desired, but reduction of error is accompanied by a corresponding increase in number of redundant samples transmitted as nonredundant; hence, some compromise is necessary.

In a preferred mode of operation the incoming data is examined, prior to transmission, by storing the largest upper sample and the smallest lower sample of any past sample from the beginning of the process or from the last non-redundant sample which has been transmitted. Each new sample is first compared with the largest past sample (or simply upper sample) to see if it is equal to, greater than, or less than the latter. If the present sample is equal to the upper sample it is considered to be redundant and the next successive sample is examined. If, on the other hand, the present sample is less than the upper sample, a further comparison is made to determine whether the present sample is equal to or greater than the past lower sample. If either is the case, the present sample is considered redundant and the next sample examined. If the present sample is less than the lower sample, it is subjected to further processing to determine whether it is equal to or greater than the value obtained by subtracting twice the selected tolerance (double tolerance) from the upper sample, and if so, it is considered redundant but is stored in place of the previous lower sample (i.e., stored as the new value of the lower sample), and the next incoming sample is examined. A further possibility is that the present sample is below or less than the upper sample minus the double tolerance, and in this case the result is indicative of non-redundancy of the previous point and that point is transmitted as a nonredundant sample having a value between the upper and lower sample, e.g., halfway. If this half-way point, which is simply the average of the upper and lower sample, is not an integer, that is, constitutes an integer plus some remaining or carry portion, the remainder is discarded and only the integer is transmitted as the non-redundant sample. The process is then continued by examining the next sample and assigning its value as the value of the upper and lower samples. Since the upper sample and the present sample are now equal, redundancy is indicated and the next sample is examined. With the transmission of each nonredundant sample, the entire process is repeated as briefly outlined above.

It should be emphasized that any value falling between the upper and lower sample will be within tolerance and may be transmitted, i.e., it need not be the average or halfway value, and further, that the tolerance may be selected arbitrarily.

All of the comparisons required in the process may be made by comparing one binary value with another on a bit by bit basis to determine whether the difference is positive, negative, or zero. The average of the upper and lower samples may be determined by simply adding the two values and shifting one binary bit to the right in the register in which the sum is accumulated, which produces a division by 2.

A variation of the extended step method is based upon storage of the most restrictive tolerances imposed by past upper and lower samples, and transmission of values only when a succeeding sample's upper and lower tolerances are both outside the stored tolerances. In the latter event, a value equal, for example, to the average of the stored most restrictive tolerances is transmitted as the nonredundant sample.

In each of these variations of the method there is additionally required a transmission of information indicative of the number of samples discarded since the last nonredundant sample was transmitted.

Accordingly, it is a further object of the present invention to provide methods and apparatus for reducing redundancy in digital data, by transmission of a vastly reduced amount of data representing a weighted average of data peaks exceeding a prescribed tolerance.

Another object is to provide methods of reducing redundancy in the transmission of digital data by checking the value of each data sample against the highest and lowest values of data samples examined since transmission of the last nonredundant sample, and if those limits are exceeded, comparing the value of the sample presently under observation with a preselected tolerance value to determine redundancy or nonredundancy of each sample.

Still another object of the invention is to provide methods in accordance with the immediately preceding object, wherein each nonredundant sample is transmitted as a weighted average of said highest and lowest values.

A further object is to provide methods and apparatus for reduction of redundancy in digital data by transmission of only those data samples exceeding the limits imposed by the most restrictive values obtained by addition and subtraction of the preselected tolerance to and from past samples.

The above and still further objects, features and attendant advantages of the present invention will become apparent from a consideration of the following detailed description of preferred methods and structural embodiments thereof, especially when taken in conjunction with the accompanying drawings, in which.

Figure 1:
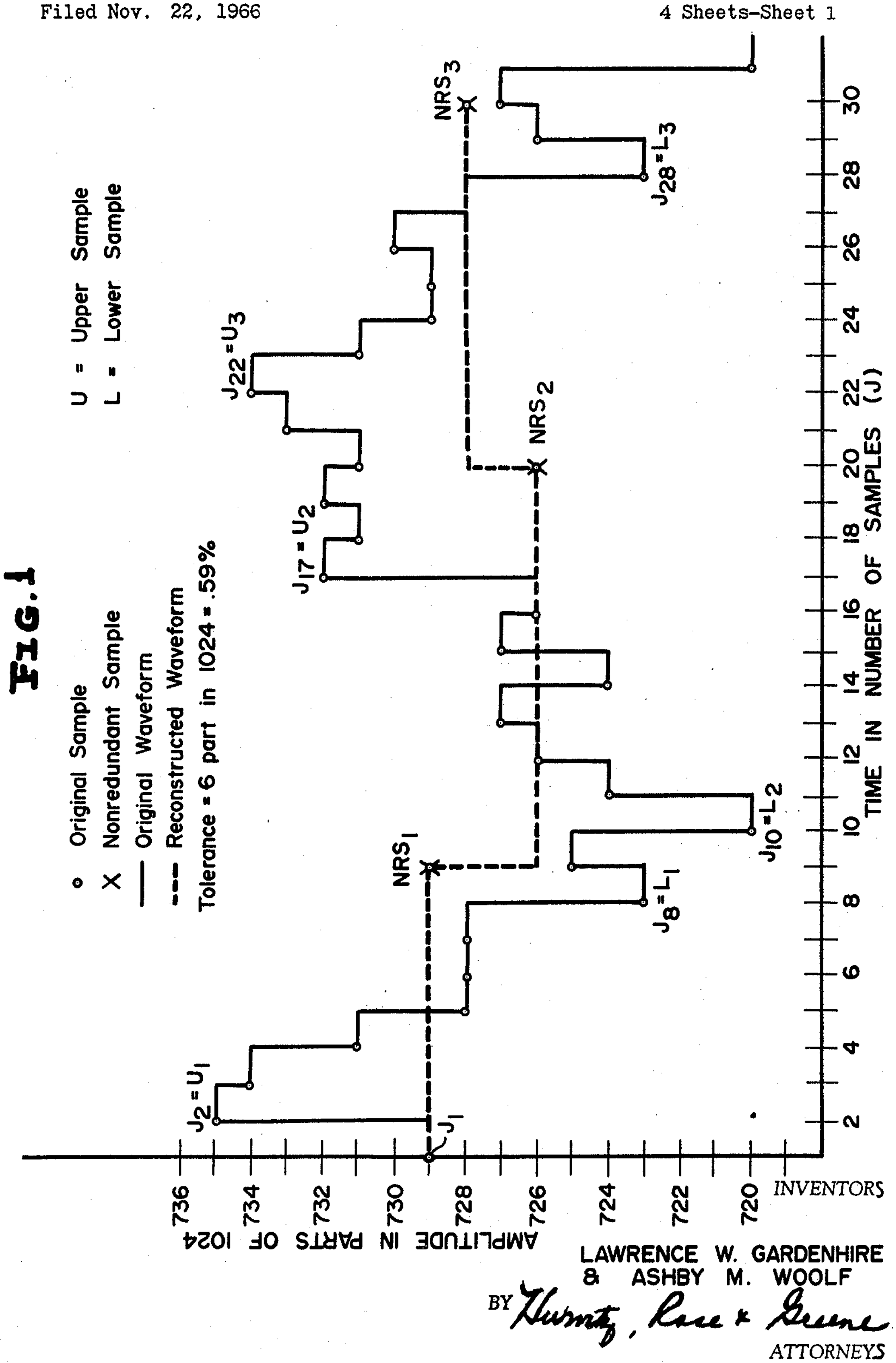
FIGURE 1 is a chart of sampled levels versus time and showing an illustrative sampled waveform useful in explaining the operation of the extended step method.

With reference now to FIGURE 1, each dot represents a sampled value of the sensed or measured input parameter which would ordinarily be transmitted if no reduction in redundancy were desired, a situation which would result in severe waste of available system capacity. For purposes of illustration it is assumed that each sample may have any one of 1024 different values, although it will be realized that successive samples would not generally differ from one extreme to the other. For the sake of clarity, the samples occurring in the portion of time under consideration are illustrated as having levels or amplitudes anywhere between the 718th and 736th parts of the total possible 1024 levels. The first sample $J_1$ has a value of 729, the second $J_2$ a value 735, the third $J_3=734$, and so forth, as shown in FIGURE 1. The straight lines connecting each sample illustrate the original waveform and the waveform which would be reconstructed at the receiving terminal absent reduction of redundancy. The crosses represent nonredundant samples which are selected and transmitted in a manner which will be discussed in detail presently and the dotted lines connecting these samples represent the waveform as reconstructed when the extended step method of reducing redundancy is employed in the transmission of data samples.

For the sake of illustration, the tolerance is selected to be six parts in the 1,024 possible levels, or a tolerance of .59 percent.

Figure 2:
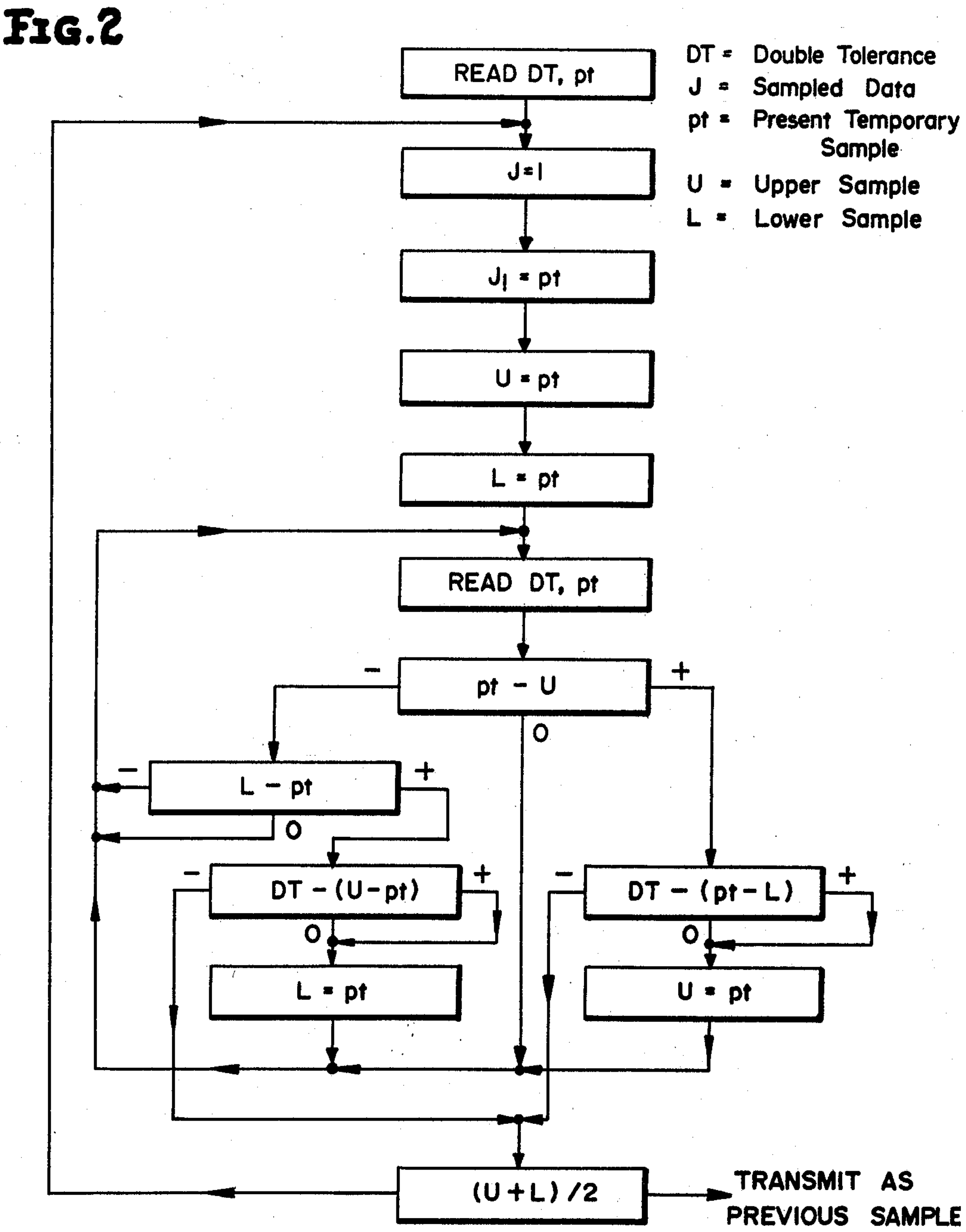
FIGURE 2 is a flow chart representing the manner in which the method is performed.

Referring now to FIGURE 2, the process starts by storing the preselected double tolerance, i.e., twice the selected tolerance value, and reading the present temporary sample of the input parameter. The present temporary sample, which will hereinafter be abbreviated *pt*, refers to the sample presently under examination and at the start of the process the value of the first sample read is stored as the value of the largest past sample and the smallest past sample, for upper and lower samples, abbreviated hereinafter as U and L, respectively.

The next sample is then read as the present temporary sample *pt*, and its value compared with U by performing the computation $pt-U$. If *pt* is greater than U, indicated by a positive result, a comparison is made between the double tolerance DT and the result of the computation $pt-L$ by subtracting the latter from the former. The resulting number can have a positive sign only if DT is greater than $(pt-L)$, meaning either that *pt* is greater than L or that L is greater than *pt*, but the latter possibility cannot exist since it has already been determined that *pt* is greater than U, which is greater than L. Therefore, a positive sign for $DT-(pt-L)$ indicates that the present temporary sample ($pt$), while greater than the present upper sample (U), is within the double tolerance referenced to slightly greater than one-half of the peak-to-peak noise. Thus, the present temporary sample is redundant but establishes a new upper sample and is therefore stored as the new value of U. The next value of the sensed parameter is then read as the present temporary sample *pt*.

If, on the other hand, *pt* is greater than U and the result of the computation $DT-(pt-L)$ is negative, then $(pt-L)$ is greater than DT. This can occur only if *pt* is more than the value of DT greater than L, an indication of a non-redundant sample at the previous sample time. The value of the non-redundant sample to be transmitted, however, is not the value of the present temporary sample nor of the immediately preceding temporary sample. Rather, the upper and lower samples presently stored are added together and the sum divided by two to obtain the value for transmission as the previous sample.

A third possibility, if *pt* is greater than U, is that $(pt-L)$ equal DT, i.e., $DT-(pt-L)$ equal zero. This is taken as an indication of redundancy and the procedure followed is the same as that indicated above for *pt* greater than U and DC greater than $(pt-L)$.

If $pt=U$, then the result of the first computation $(pt-U)$ is zero, indicating redundancy, and the next sample point is examined.

In cases where the present temporary sample is less than the stored upper sample, i.e., *pt* less than U, *pt* is compared with the stored lower sample (L) by subtraction of the former from the latter. A positive sign for the resulting number indicates that L is greater than *pt*. However, this does not in and of itself indicate either that *pt* is redundant or that it should be stored as the new value of the lower sample. In order to make these decisions, $(U-pt)$ is compared with DT by subtracting the former from the latter. As in the previous example, three possibilities exist; namely, that $DT>(U-pt)$, $DT<(U-pt)$, or $DT=(U-pt)$, resulting in positive, negative, or zero result, respectively, from the subtraction process. A positive result can occur for U greater than *pt* or U less than *pt*, but it has already been established that *pt* is less than U if this series of computations is required. Consequently, a positive output (or zero) resulting from the subtraction of $(U-pt)$ from DT indicates that *pt* should be stored as the new value of the lower sample but that it is not less than U by an amount greater than DT, and hence is redundant.

A negative output can result from the computation $DT-(U-pt)$ only if U is greater than *pt* by an amount exceeding the value of the double tolerance. This, then, is an indication that the immediately preceding temporary sample is nonredundant and a value equal to $(U+L)/2$ is transmitted as the value of the preceding sample.

A negative or zero reading for the computation $L-pt$ is indicative of a redundant sample and the next value of the parameter of interest is sampled for processing.

Figure 3:
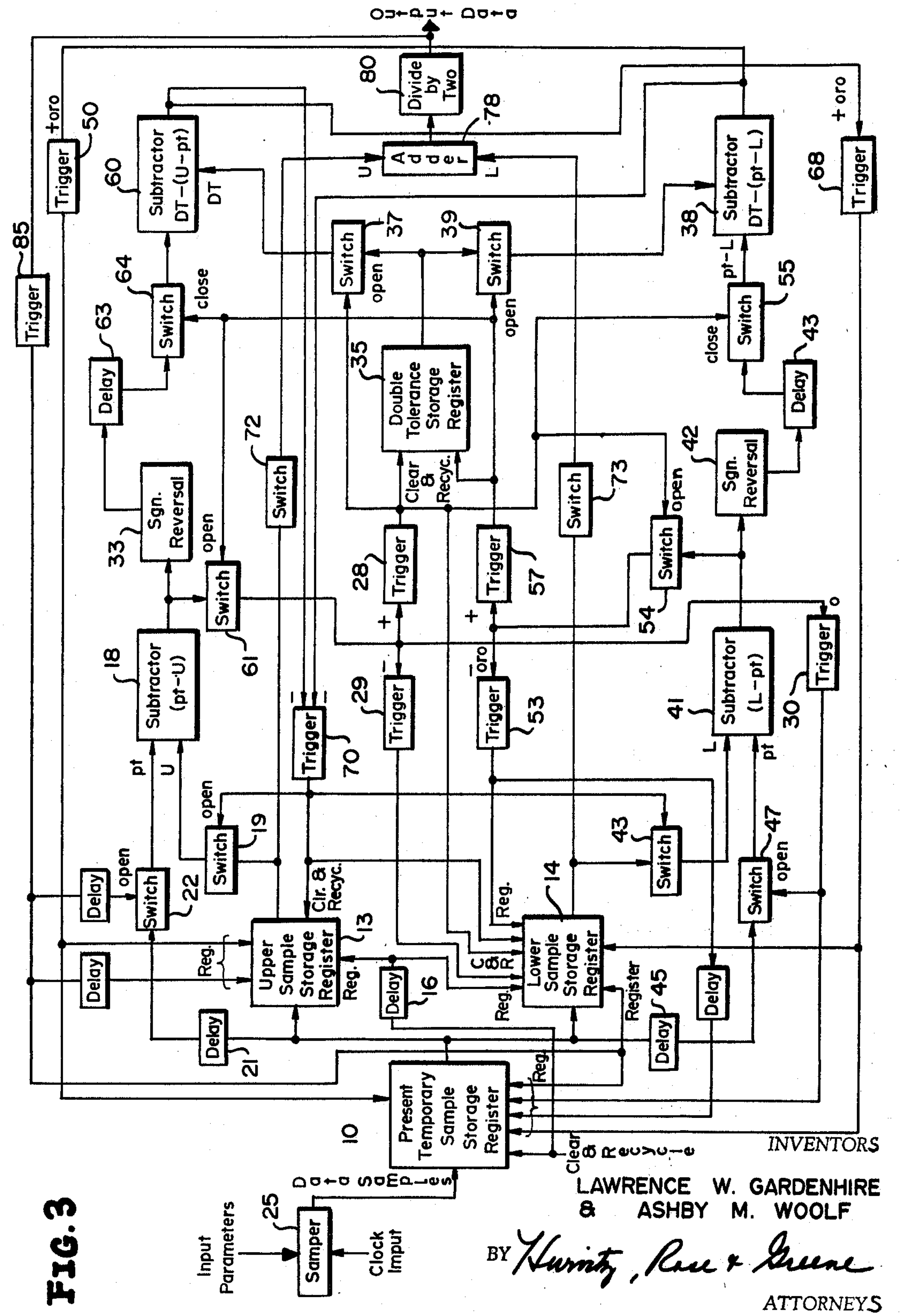
FIGURE 3 is a block diagram of an exemplary embodiment of a system for implementing the method of FIGURE 2.

An exemplary embodiment of a system suitable for implementing the method which has just been described is shown in FIGURE 3. Referring to FIGURE 3, initially the *pt* storage register 10 is cleared and recycled to generate the binary number of the sample stored therein, with concurrent restorage thereof through the recycling. Simultaneously therewith, the upper and lower sample storage registers 13 and 14 are instructed to register the incoming binary number from the *pt* storage register 10. After a slight delay introduced by delay unit 16, U storage register 13 in instructed to clear and recycle in order to apply the value U to subtractor 18, via normally closed switch 19, simultaneously with the arrival thereat of *pt* through delay unit 21 and normally closed switch 22. Each of these delay units and each of the delay units to be subsequently discussed is employed to permit a previous instruction or computation in the process to be completed before a new computation is made. The delay introduced by each delay unit is set accordingly.

The maximum time required for processing a present temporary sample should be adjusted to be less than the time interval between incoming samples to *pt* storage register 10. The latter interval is preselected in accordance with a clock input to sampler 25, which may be a sequential scanning switch or commutator followed by a multiplexer, or simply a single transducer responsive to a particular physical parameter and followed by a sampling switch, for example.

Subtraction of U from *pt* in subtractor 18 may result in either a positive or a negative or a zero output therefrom. The output of subtractor 18 is fed in parallel to trigger circuits 28, 29 and 30, each of which may be a Schmitt trigger with appropriate threshold to produce a trigger pulse upon application of appropriate input thereto. The output of subtractor 18 is also fed to a polarity inverter 33 for reversing the sign of the binary number resulting from the subtraction process. If the output of subtractor 18 is positive, indicative of *pt* greater than U, trigger circuit 28 responds to this positive output to supply a clear and recycle pulse to double tolerance storage register 35 in which a value equal to twice the preselected tolerance (as referenced to the mid-point of the peak-to-peak noise) is stored. Thus the double tolerance value is generated as an output of register 35 with concurrent internal recycling to maintain storage of that value in the register.

The output pulse generated by trigger circuit 28 is also applied to normally closed switch 37 to change the state of that switch to an open condition. Consequently, the double tolerance value consisting of a binary number is applied, at this point in the process, only to subtractor 38 via normally closed switch 39 for comparison of the double tolerance value with the binary value of $pt-L$. The latter number is obtained by reversing the sign of the output of subtractor 41 through the operation of polarity inverter 42. To this end, the output pulse of trigger circuit 28 is also supplied as a clear and recycle instruction to lower sample storage register 14. Hence, the value L is applied to one input terminal of subtractor 41 through normally closed switch 43 while the value *pt* is applied to the other input terminal subtractor 41 from storage register 10 via delay unit 45 and normally closed switch 47. The output of subtractor 41 is fed to subtractor 38 via normally open switch 55, closed by the pulse from trigger 28, and is prevented from passing to trigger circuits 53 and 57 because of the opening of normally closed switch 54.

If the comparison of the double tolerance value and the difference between the present temporary sample value and the lower sample value in subtractor 38 produces a positive or zero output a pulse is generated by trigger circuit 50 to clear the *pt* storage register 10 and to instruct upper sample storage register 13 to store the value of *pt* generated by register 10 therein as the new value of U. Storage register 10 is therefore ready to accept the value of the next sample from circuit 25.

If the result of the operation $pt-U$ by subtractor 18 is zero, trigger circuit 30 generates a pulse to change the state of switch 47 to an open condition and to clear *pt* storage register 10 in readiness for the next incoming sample.

A negative value for the output of subtractor 18 causes trigger circuit 29 to generate an output pulse which is applied to lower sample storage register 14 as a clear and recycle instruction. As a result, the computation $L-pt$ is performed by subtractor 41, the value *pt* having been supplied via delay line 45 and normally closed switch 47 in the previously described manner. The output of subtractor 41, in addition to being applied to sign reversing circuit 42, is, if negative or zero, effective to cause trigger circuit 53 to apply a clear pulse to storage register 10 for storage of the next sample. In such a case no input is supplied to subtractor 38 since switch 55 preceding that subtractor is normally open.

A positive output from subtractor 41 results in the generation of a pulse by trigger circuit 57 which instructs DT storage register 35 to clear and recycle its contents and simultaneously opens switch 39 so that the double tolerance value generated by register 35 is supplied only to subtractor 60, via normally closed switch 37, for comparison of DT with the value $U-pt$. The value $U-pt$ is obtained from subtractor 18 with sign reversal performed by polarity inverter 33 and transfer through delay unit 63 and switch 64. No input is supplied to subtractor 60 prior to the set of conditions presently under discussion since switch 64 is normally open, being closed in response to a pulse from trigger circuit 57, while normally closed switch 37 is opened in response to a pulse applied by trigger circuit 28. In addition, switch 61 is opened by the output pulse of trigger circuit 57 to prevent passage of the output of subtractor 18 to any of trigger circuits 28, 29 and 30.

If the output of subtractor 60 is positive or zero, trigger circuit 68 supplies a clear pulse to *pt* storage register 10 and a "register" instruction to lower sample storage register 14, so that *pt* is read into register 14 as the new value of L while register 10, having been cleared, is ready to accept the next sample.

A negative output from subtractor 60 during the presently considered computation, or from subtractor 38 during the previously considered comparison by the latter unit, causes the generation of a clear pulse by trigger circuit 70 to both upper sample storage register 13 and lower sample storage register 14. The same pulse is also applied to both of normally closed switches 19 and 43, placing them in an open condition, Hence, the values of U and L generated by registers 13 and 14 in response to the clear instruction from trigger circuit 70 are applied through normally open switches 72 and 73, respectively, (closed by the pulse from circuit 70) to binary adder 78. The output of the adder is divided by two by divider 80, and the output of the divider transmitted after discarding any carry or remainder from an integer value, as the value of the data point or sample immediately preceding the present temporary sample. The output of the divider is also applied to trigger circuit 85 for supplying a clear pulse to *pt* storage register 10 and, after a time lapse introduced by delay units 87 and 88 sufficient to permit the next sample to appear as an output of storage register 10, a register pulse to upper and lower storage registers 13 and 14.

A specific example of the operation performed by the method and apparatus according to the present invention will now be discussed with reference again to FIGURE 1. The process starts by storing the double tolerance value which, in this example, has been selected as 12. The first sample $J_1$ is read as 729 and assigned as *pt*, the present temporary sample. This value is also assigned as the upper sample $U_1$ and as the lower sample $L_1$. The stored values are now $DT=12$, $U_1=729$, $L_1=729$, and $pt=729$. Accordingly, a new value of *pt* is read from the input parameter, as $J_2=735$. This value is compared with $U_1$, viz, $735-729=+6$. Since the result is positive, a comparison is made between the double tolerance and $(pt-L)$. This is the computation $12-(735-729)=+6$. Since this value is positive, the value of $J_2$, 735, is stored as the new value of U. $J_3=734$ is then read as the new value of *pt*. The stored values are now $U=735$, $L=729$, and $pt=734$. The computation $pt-U$ produces the result $734-735=-1$. Since the value is negative a comparison is made between L and *pt*, $729-734=-5$. This negative output is indicative of redundancy and $J_4$ is read as the new value of *pt*, equal to 731.

This present temporary sample is compared with U and produces the result $731-735=-4$. The negative number indicates that L is to be compared with *pt* by subtracting the latter from the former, which results in $-2$. The sample is therefore redundant and $J_5$ is read as the new value of $pt=728$. Further consideration of the flow chart of FIGURE 2 and the implementing structure of FIGURE 3 will indicate that the first nonredundant sample is discovered when $J_{10}$, 720, is read as the present temporary sample. A comparison of this value of *pt* with U by subtracting the latter from the former produces a result of $-15$. The negative result indicates that *pt* is to be subtracted from L, yielding a result of $+3$. The positive result indicates the necessity of comparing the double tolerance with the difference between U and *pt* or, $12-(735-720)=-3$.

The negative number means that there is a non-redundant sample at previous sample point $J_9$. The value of this non-redundant sample is determined by adding U to L and dividing the sum by two, $(735+723)/2=729$. This value is then transmitted as sample $J_9$ and reconstruction is performed backwards (at the receiver) to the beginning of the transmitted data. This is shown by the first portion of the dotted line in the graph of FIGURE 1.

A continuation of the process in accordance with the method as previously discussed will readily be observed to yield three nonredundant samples in the 30 original samples. Thus, there is a reduction of 30 samples to three transmitted nonredundant samples, providing a sample reduction, $(S_r)$ of 10:1, and the reconstructed waveform is never in error by more than 6 parts in 1024, the selected tolerance in the number of possible levels each sample may take. Since the nonredundant samples are transmitted asynchronously it is necessary to transmit additional information with each sample to indicate when that sample occurred. This may be accomplished, for example, by use of a run length counter of conventional design, whose output code readily indicates the number of samples that have been discarded since the last nonredundant sample was transmitted. In the example of FIGURE 1, a maximum of ten samples were discarded as redundant between the first nonredundant sample and the second nonredundant sample. Accordingly, a four-bit word could be added to each nonredundant sample for timing. The bit reduction, $B_r$, in such a case would be $$30\times10/(10+4)\times3=7.14:1.$$

Other timing methods may also be employed, such as the use of a code word to indicate which sample number is being transmitted. This would, however, require a word with a sufficient number of bits to resolve the largest number of samples between synchronization. For a total of 500 samples, a nine-bit timing code word would be required for such purpose, as compared with a four-bit run length code.

It will be observed that the maximum absolute error between the reconstructed waveform and the original waveform is equal to the selected tolerance divided by the number of possible level each sample may take. In other words, the reconstructed waveform is never in error by more than the number of levels represented by the selected tolerance.

A variation of the extended step method described above is to store the most restrictive past upper and lower tolerances and to transmit subsequent samples only when the value of the subsequent sample upper and lower tolerances fall outside the most restrictive stored tolerances.

Figure 4:
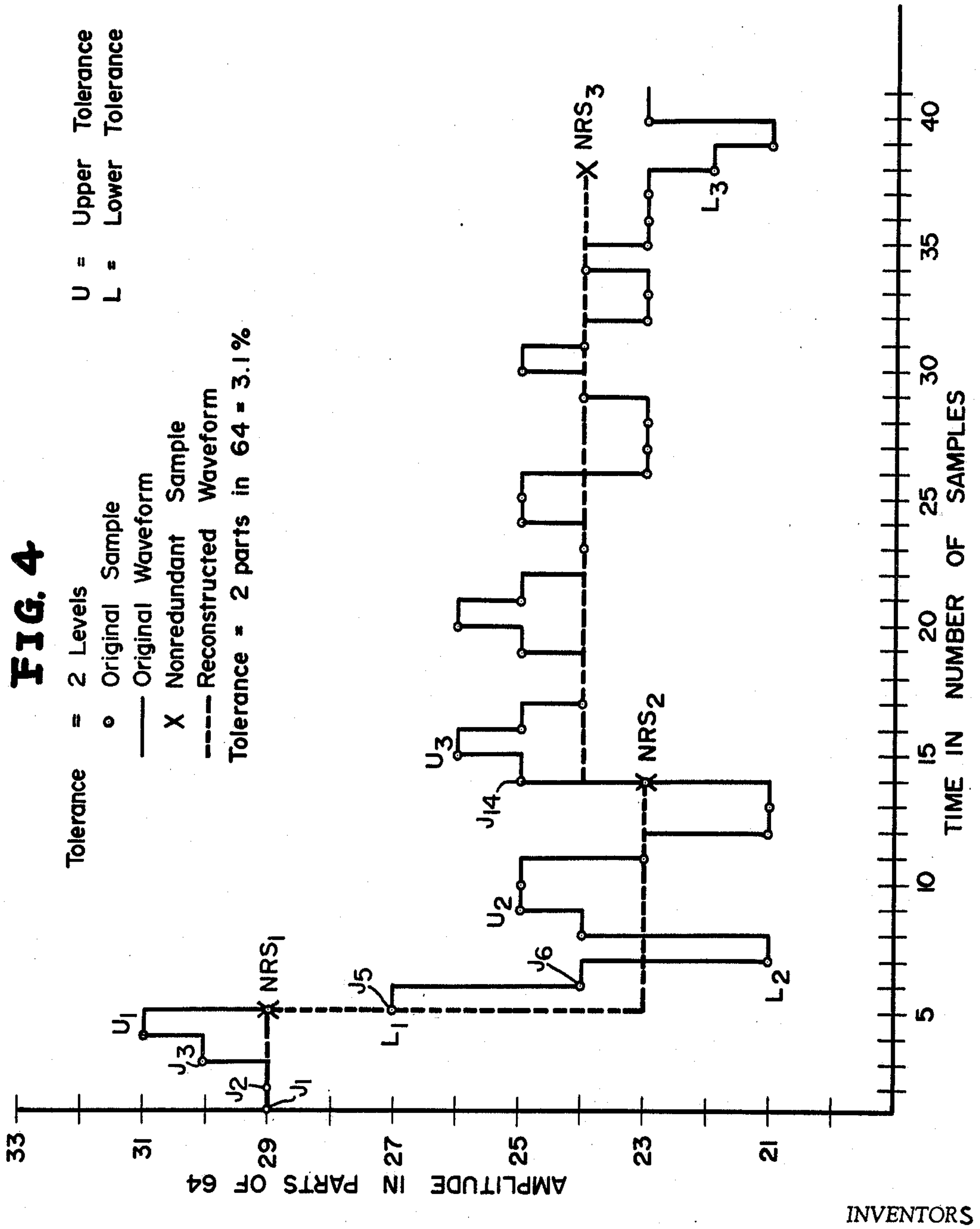
FIGURE 4 is a graph of sampled levels versus time for raw input parameters useful in illustrating the operation of a variation of the extended step method employing most restrictive tolerance.

Referring now to FIGURE 4, the manner in which the most restrictive tolerance variation of the extended step method is carried out is exemplified in respect to an average line of television data which has been undersampled and is characterized by the presence of a large amount of noise. The preselected tolerance is added to and subtracted from the first sample (or the sample immediately following transmission of a nonredundant sample). For the sake of illustration, the tolerance is selected as two levels out of 64, and thus the most restrictive tolerances for sample $J_1=29$ are 31 (upper tolerance) and 27 (lower tolerance). These upper and lower tolerance values are stored for further use and sample number one is discarded.

The second sample, $J_2$ (also having the value 29), is now examined and upper and lower tolerances established about its value. These are then compared separately with the previously calculated and stored upper and lower tolerances, respectively; if either falls on or within the respective tolerance, the sample under observation is considered redundant and is discarded. Since $J_2$ and $J_1$ have identical values, it will be observed that both upper and lower tolerance therefor are also identical, so that $J_2$ is dropped as redundant.

The same procedure is followed for each succeeding sample. In every case, if the comparison of calculated upper and lower tolerances for the sample presently considered results in either being on or within the previously stored upper and lower tolerances, the present sample is redundant. That sample may, however, establish a new value of one of the most restrictive tolerances, if one of its respective tolerances is lower than the past upper tolerance or greater than the past lower tolerance. For example, sample $J_3$ has the value 30; hence, its lower tolerance, 28, is within the boundaries $UT=31$ and $$LT=27$$

and is larger than the previously stored $LT=27$, so that the value 28 is now stored as the new value of LT, being more restrictive than the preceding stored lower tolerance.

Proceeding in like fashion, each data sample is checked until a nonredundant sample is encountered, in which case the average of the stored most restrictive past upper and lower tolerances is transmitted as the value of the nonredundant sample. This situation occurs, in the present example of FIGURE 4, for sample $J_6$. When $J_6$ is examined it will be noted from a follow up of the preceding discussion that the stored most restrictive tolerances are $UT=29$ and $LT=29$. For $J_6$, both calculated tolerances ($UT=26$ and $LT=22$) are outside the stored most restrictive tolerances and hence $(29+29)/2=29$ is transmitted as the nonredundant sample ($NRS_2$). At the receiver, reconstruction of redundant samples is performed backward from the present nonredundant sample to the last nonredundant sample (or to the beginning of data transmission). In FIGURE 4, this is shown by the dotted straight line from NRS, back to the beginning of sampling. Of course, it is necessary to transmit a code indicating the number of samples which have been discarded since the last nonredundant sample, as by use of a run length counter.

Data sample $J_7$ now establishes the new most restrictive upper and lower tolerances and the process is again performed in the manner illustrated above for each succeeding sample. The reader may readily observe that nonredundant samples are transmitted for $J_5$, $J_{14}$, and $J_{39}$ (each of these samples immediately preceding a point at which non-redundancy was established). It will further be noted that in no case does the reconstructed (dotted) line vary more than two levels from the original waveform.

It should be emphasized that the two methods which have been described are in fact variations of the same method, i.e., the extended step method, and produce the same results under all conditions. Again, references to values of data transmitted, such as average value, are for the sake of example only, since other values within the limitations imposed will work equally well.

We claim:

1. A method of reducing the amount of redundant digital data transmitted from sampled values of an observed parameter, comprising storing the highest and lowest of the sampled values obtained since the transmission of the last nonredundant sample, comparing each sampled value with limiting values consisting of the highest and lowest values presently stored, and if these limits are exceeded, transmitting as a nonredundant sample a value between said limiting values when the sample presently under observation is greater than said lowest value or less than said highest value by a preselected tolerance value.

2. The method of claim 1 wherein is included the steps of storing the value of the present sample as the highest or lowest value of the samples examined since transmission of the last nonredundant sample, when said present sample exceeds the respective one of said limiting values by less than said preselected tolerance and then discarding said present sample.

3. The method of claim 1 wherein the value transmitted as a nonredundant sample is the integer equal to or immediately below the average value of said limiting values.

4. The method of claim 2 wherein is further included the step of transmitting a digital code with each nonredundant sample, indicative of the number of samples discarded since transmission of the last nonredundant sample.

5. A method of reducing redundancy in digital data obtained in the form of data samples representative of time-varying values of one or more detected parameters, comprising the steps of comparing the value of each data sample against the highest and lowest values of data samples examined since transmission of the last nonredundant sample; and if said highest value is exceeded by the value of the data sample presently under examination, comparing the value of the present sample with the sum of a predetermined tolerance value and said lowest value; or if the present sample has a value below said lowest value, comparing said present sample value with the difference between said highest value and said preselected tolerance value; and transmitting as a nonredundant sample an integer whose value is approximately the average of the present of said highest and lowest values when said present sample value exceeds either said sum or said difference.

6. A method of reducing redundancy in digital data to be transmitted, comprising establishing about each sampled value of said data a pair of upper and lower boundary values each equivalent to a preselected tolerance value from the present sampled value, changing one of said boundary values to the respective upper or lower boundary value of a succeeding sampled value when said respective boundary value is within the existing boundary values, and transmitting as a nonredundant sample the average of said existing boundary values when both boundary values of a succeeding sampled value are outside said existing boundary values.

7. The method of claim 6 wherein a new pair of upper and lower boundary values is established about the sampled value obtained following transmission of a nonredundant sample.

8. The method of claim 6 wherein a digital code indicative of the number of samples discarded since transmission of the last nonredundant sample is transmitted with each nonredundant sample.

9. Apparatus for transmitting substantially only nonredundant sampled values of a detected parameter in accordance with boundaries established by a preselected tolerance value much less than the range of values each sample may assume, comprising means for storing sampled values; means for determining the highest and lowest of the sampled values examined since transmission of the last nonredundant sample and for inserting said highest and lowest values in said storing means; means for comparing each sampled value with the presently stored highest and lowest sampled values to determine whether the sampled value presently under examination is greater than said highest value or less than said lowest value; means for further comparing each sample greater than said highest value or less than said lowest value with said preselected tolerance value and for selecting those further compared samples having a value respectively greater than said lowest value or less than said highest value by an amount exceeding said tolerance value as indicative of nonredundancy; and means for transmitting as a nonredundant sample a value between said highest and lowest values when an indication of nonredundancy is obtained.

10. The combination according to claim 9 wherein said means for transmitting includes means for generating as the value to be transmitted substantially the average of said highest and lowest values.

11. The invention according to claim 10 wherein is further included means for transmitting with each nonredundant a digital code representative of the number of samples examined since transmission of the last nonredundant sample.

References Cited

UNITED STATES PATENTS 2,963,551 12/1960 Schreiber et al. ---- 179—15.85

OTHER REFERENCES

D. R. Weber, "A Synopsis on Data Compression," 1965 (June) Proceedings, National Telemetering Conference, pp. 9–16.

ROBERT L. GRIFFIN, Primary Examiner

J. A. BRODSKY, Assistant Examiner

U.S. Cl. X.R.

178—6; 179—15.55; 325—41, 141; 340—172